UNITED STATES PATENT OFFICE 1,967,865

CHEMICAL PRODUCT AND PROCESS FOR PRODUCING SAME

Arnold M. Collins, Wilmington, Del., assignor to E. I. du Pont de Nemours & Company, Wilmington, Del., a corporation of Delaware No Drawing. Application February 1, 1934, Serial No. 709,299

13 Claims. (Cl. 134—26)

This invention relates to a process for the production of synthetic rubber having improved tensile strength and resistance to aging. More specifically it relates to the production of improved synthetic rubbers which are made by polymerizing chloro- and bromo-2-butadiene-1,3 into latices.

This case is a continuation in part of application, Serial No. 537,484, filed May 14th, 1931.

It is an object of this invention to prepare greatly improved synthetic rubber products. A further object of this invention is to describe a method of improving rubber-like products obtained from latices of chloro- or bromo-2-butadiene-1,3 by adding oxidizing agents before, during or after polymerization of the latices. Other objects will appear hereinafter.

It has been found that by adding small amounts of oxidizing agents to aqueous emulsions of chloro- or bromo-2-butadiene-1,3 either before polymerization or after the compounds have been polymerized to form synthetic latices, synthetic rubbers of greatly increased tensile strength, resistance to aging and tear resistance are obtained and that the action of these oxidizing agents in accomplishing this result is independent of the presence of other compounds added for other purposes.

The following examples describe the preferred embodiments of this invention but they are presented for purposes of illustration only.

Example 1

400 grams of water containing 8 grams of dissolved sodium oleate and 4 grams of potassium persulfate is rapidly stirred by means of a mechanical stirrer, and 400 grams of chloro-2-butadiene-1,3 is then added slowly with constant stirring. A homogeneous emulsion results. This emulsion is then maintained at 10° C. for 48 hours, after which time polymerization of the chloro-2-butadiene-1,3 is substantially complete. The resulting pure white, fine dispersion of polymerized chloro-2-butadiene-1,3 is treated with 16 grams of ordinary concentrated ammonium hydroxide solution and then with 4 grams of phenyl-beta-naphthylamine which is first dispersed in water by grinding in a ball mill with a 2% sodium oleate solution. The resulting stabilized and compounded dispersion is strained through several layers of cheese cloth to remove any large solid particles, and is then ready for use.

The synthetic latex made as described is allowed to pass through a sharply pointed nozzle with a circular aperture approximately 0.6 mm. in diameter into a bath containing a mixture of ordinary concentrated hydrochloric acid and ethyl alcohol in the ratio of 1:4 by volume. In order to prevent the passage of the coagulating liquid backward into the nozzle, it is desirable to start the flow of latex through the nozzle before it is immersed in the coagulating bath. Coagulation of the issuing latex takes place immediately at the nozzle. The resulting continuous strand of coagulated synthetic rubber is continuously removed from the acid bath by a suitable arrangement of rotating rollers and is then passed through a bath containing a mild alkaline solution such as sodium bicarbonate to neutralize the adhering acid. After coating or dusting the strand with talc or soapstone, to facilitate handling, it is dried by winding on spools which are then allowed to stand overnight at room temperature.

Two other strands are prepared from the same batch of chloro-2-butadiene-1,3 employing the method just described, except as follows: In the preparation of one latex, 4 grams of sodium perborate (tetrahydrate) are used in place of the potassium persulfate, and in the preparation of the other latex (standard latex), no oxidizing agent is added.

The three dried strands are transferred to an oven operated at 80° C. At intervals of one or more days, portions of the three strands are removed from the oven, allowed to stand overnight at room temperature, and tested to determine their tensile strengths. The results of these tests appear in the following table.

| Days at 80° C. | Tensile strength—lbs. per square inch | | |
|---|---|---|---|
| | Standard latex | Latex with $K_2S_2O_8$ | Latex with $NaBO_3.4H_2O$ |
| 1 | 3600 | 5200 | 4350 |
| 4 | 5600 | 5750 | 4900 |
| 9 | 5800 | 6600 | 5700 |
| 11 | 6000 | 6900 | 5800 |
| 14 | 5000 | 7600 | 5900 |
| 16 | 4000 | 7800 | 6000 |
| 18 | 3000 | 7800 | 5500 |
| 20 | | 7200 | 4300 |
| 22 | Failed. | 5900 | 3200 |
| 30 | | 4900 | |
| 36 | | 4800 | |
| 42 | | 4500 | |

The increased tensile strength and resistance to aging shown by the strands treated with potassium pesulfate and sodium perborate prior to latex formation will be apparent from the table.

Example 2

A quantity of latex is prepared from chloro-2-butadiene-1,3 as described in Example 1, except that no potassium persulfate or other oxidizing agent is added. The latex so prepared is divided into two portions. One portion is spun into a strand as described in Example 1. To a second portion is added an aqueous solution of potassium persulfate containing 0.25% of the salt based on the weight of chloro-2-butadiene-1,3. After vigorous agitation to insure complete dispersion of the potassium persulfate, the latex is spun into a thread as described in Example 1.

The dried threads are subjected to aging and tensile strength tests as in Example 1. The thread made from latex to which potassium persulfate is added shows marked increase in tensile strength and resistance to aging over the thread made from standard latex.

Example 3

A solution of 0.25 grams of benzoyl peroxide in 100 grams of chloro-2-butadiene-1,3 is emulsified in 100 grams of a 2% sodium oleate solution. Polymerization of the chloro-2-butadiene-1,3 is effected by maintaining the emulsion at 0–10° C. for 48 hours. The resulting latex is treated with 10 cc. of 2.6% ammonium hydroxide solution and 1 gram of phenyl-beta-naphthylamine dispersed in glue and petroleum sulfonate. Fibers spun from this latex and tested as described in Example 1, exhibited decidedly increased tensile strength and resistance to aging when compared with fibers made from standard latex.

Example 4

100 grams of chloro-2-butadiene-1,3 is emulsified in 100 grams of a 2% sodium oleate solution containing 0.5 gram of ammonium nitrate. The emulsion is polymerized and treated as in Example 3. Films are prepared from the resulting latex, by spreading on porous plates and drying at 80° C. for 48 hours. The dried films show an unusually high tear resistance compared with films made from standard latex.

Although oxidizing agents have been applied to latices of but one composition in the above examples, it is to be distinctly understood that the practice of this invention is not limited thereto. The invention is applicable to synthetic latices made from chloro- and bromo-2-butadiene-1,3 by any method and containing any percentage of chloro- or bromo-2-butadiene-1,3. Any of the latices prepared according to the process described in applicant's copending application, identified above, of which this application is a continuation in part, may be treated in the manner described herein. Likewise, the improvements obtained by this invention are independent of other compounds present such as emulsifying agents and antioxidants.

In the above examples, mention is made of only two forms of synthetic rubber—strands or fibers and films. It will be apparent that this invention applies equally as well to synthetic rubber in any form such as sheets, articles made by dipping, etc., when prepared from latices.

While the preferred oxidizing agents are potassium persulfate, benzoyl peroxide and ammonium nitrate other oxidizing agents or mixtures of oxidizing agents may be employed with varying degrees of success, provided they do not exert deleterious or destructive actions upon the latices in addition to their catalytic action, these include, potassium chlorate, manganese dioxide, potassium permanganate, mercuric oxide (red), and hydrogen peroxide.

Although the preferred percentage of oxidizing agent, based on the chloro- or bromo-2-butadiene-1,3 is in the range between 0.1% and 0.5%, this invention is not to be limited to this amount but will include any percentage up to 2.0% to accomplish the desired results.

As shown in the examples, the oxidizing agents may be added before polymerization is effected or after it is substantially complete and the synthetic rubber is in the form of a latex. We prefer to add the oxidizing agents before polymerization to secure better incorporation in the synthetic rubber, but the same desirable results are obtained when the oxidizing agents are added to the latex itself.

The advantages of this invention are apparent as it is always desirable to increase the tensile strength, resistance to aging and tear resistance of a rubber, synthetic or natural. The improvements brought about will broaden the uses of synthetic rubber made from chloro- or bromo-2-butadiene-1,3 and make it more useful in its present applications.

It is apparent that many widely different embodiments of this invention may be made without departing from the spirit and scope thereof, therefore, it is not to be limited except as indicated in the appended claims.

I claim:

1. An aqueous emulsion comprising chloro-2-butadiene-1,3 and an oxidizing agent.

2. An aqueous dispersion comprising a polymer of chloro-2-butadiene-1,3 and an oxidizing agent.

3. An aqueous dispersion comprising a polymer of chloro-2-butadiene-1,3, an oxidizing agent and an emulsifying agent.

4. An aqueous alkaline dispersion comprising a polymer of chloro-2-butadiene-1,3 and an oxidizing agent.

5. In the process of preparing synthetic latices of chloro-2-butadiene-1,3, the step which comprises adding thereto an oxidizing agent.

6. In the process of preparing synthetic latices comprising chloro-2-butadiene-1,3, the step which comprises adding thereto an oxidizing agent before polymerization.

7. An aqueous emulsion comprising a mono-halogen substituted butadiene and an oxidizing agent.

8. In the process of preparing aqueous dispersions of mono-halogen substituted butadienes, the step which comprises adding thereto an oxidizing agent.

9. In the process of preparing aqueous dispersions of mono-halogen substituted butadiene polymers, the step which comprises adding thereto an oxidizing agent before polymerization.

10. An aqueous dispersion comprising bromo-2-butadiene-1,3 and an oxidizing agent.

11. An aqueous dispersion comprising a polymer of bromo-2-butadiene-1,3 and an oxidizing agent.

12. In the process of preparing synthetic latices comprising bromo-2-butadiene-1,3, the step which comprises adding thereto an oxidizing agent.

13. In the process of preparing synthetic latices comprising bromo-2-butadiene-1,3, the step which comprises adding thereto an oxidizing agent before polymerization.

ARNOLD M. COLLINS.